US009496984B2

(12) United States Patent
Christoffersson et al.

(10) Patent No.: US 9,496,984 B2
(45) Date of Patent: Nov. 15, 2016

(54) METHOD AND ARRANGEMENT IN A WIRELESS COMMUNICATION SYSTEM

(75) Inventors: Jan Christoffersson, Lulea (SE); Jonas Fröberg Olsson, Ljungsbro (SE); Kjell Larsson, Lulea (SE); Peter Ökvist, Lulea (SE); Arne Simonsson, Gammelstad (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 654 days.

(21) Appl. No.: 13/379,786

(22) PCT Filed: Jun. 29, 2009

(86) PCT No.: PCT/SE2009/050829
§ 371 (c)(1),
(2), (4) Date: Dec. 21, 2011

(87) PCT Pub. No.: WO2011/002356
PCT Pub. Date: Jan. 6, 2011

(65) Prior Publication Data
US 2012/0157147 A1    Jun. 21, 2012

(51) Int. Cl.
*H04B 17/373* (2015.01)
*H04L 1/00* (2006.01)
(Continued)

(52) U.S. Cl.
CPC .............. *H04L 1/0026* (2013.01); *H04B 17/23* (2015.01); *H04B 17/373* (2015.01); *H04L 1/0019* (2013.01); *H04W 24/08* (2013.01); *H04L 41/147* (2013.01); *H04L 2001/0093* (2013.01)

(58) Field of Classification Search
CPC .......... H04B 17/0075; H04B 17/0077; H04B 17/23; H04B 17/373; H04L 1/0026; H04L 1/0019; H04L 41/147; H04L 2001/0093; H04W 24/08
USPC ...................... 455/450–453, 509, 67.11, 517
See application file for complete search history.

(56) References Cited

U.S. PATENT DOCUMENTS 6,748,233 B1    6/2004  Arnold et al.
7,366,106 B2 *  4/2008  Uchida et al. ................ 370/252
(Continued)

FOREIGN PATENT DOCUMENTS

EP    0877533 A2    11/1998
EP    1619912 A1    1/2006
(Continued)

*Primary Examiner* — Raymond Dean
(74) *Attorney, Agent, or Firm* — Patents on Demand P.A.; Brian K. Buchheit; Scott M. Garrett

(57) ABSTRACT

Method and arrangement in a mobile terminal for predicting future data communication performance of transmissions between a base station and the mobile terminal. The base station and the mobile terminal are comprised in a wireless communication system. The method comprises receiving information from the base station, concerning the relation between distribution characteristics and the performance of established data communications via the base station, comparing the own distribution characteristics of the mobile terminal with the received information, determining the own predicted data communication performance based on the made comparison between the own distribution characteristics and the received information, and displaying the determined own predicted data communication performance on a display of the mobile terminal. Also, a method and arrangement in a base station for assisting a mobile terminal in predicting future data communication performance of transmissions is comprised.

20 Claims, 9 Drawing Sheets

(51) Int. Cl.
  *H04B 17/23*  (2015.01)
  *H04W 24/08*  (2009.01)
  *H04L 12/24*  (2006.01)

(56) References Cited

U.S. PATENT DOCUMENTS

| | | | |
|---|---|---|---|
| 7,535,839 B2 * | 5/2009 | Kadaba et al. | 370/230 |
| 2004/0259564 A1 * | 12/2004 | Farley et al. | 455/453 |
| 2005/0058137 A1 * | 3/2005 | Carlson et al. | 370/395.4 |
| 2005/0124347 A1 * | 6/2005 | Hosein | H04W 36/0083 455/446 |
| 2007/0002765 A1 | 1/2007 | Kadaba et al. | |
| 2007/0060178 A1 * | 3/2007 | Gorokhov et al. | 455/506 |
| 2009/0046665 A1 * | 2/2009 | Robson et al. | 370/332 |
| 2009/0116589 A1 | 5/2009 | Zhang et al. | |

FOREIGN PATENT DOCUMENTS

| | | |
|---|---|---|
| WO | 0031990 A2 | 6/2000 |
| WO | 0033592 A1 | 6/2000 |
| WO | 2004042982 A2 | 5/2004 |
| WO | 2004105314 A2 | 12/2004 |
| WO | 2005060209 A1 | 6/2005 |

* cited by examiner

METHOD AND ARRANGEMENT IN A WIRELESS COMMUNICATION SYSTEM

TECHNICAL FIELD

The present invention relates to a method and arrangement in a mobile terminal and a method and arrangement in a base station. More in particular, the present invention relates to a mechanism for predicting future data communication performance of transmissions between the base station and the mobile terminal within a wireless communication system.

BACKGROUND

As mobile broadband services emerge, operators often provide information of the maximum bit rate that could be achieved from a technological point of view, but due to e.g. fundamental radio aspects, network planning, behaviour of other users, load in the network, etc. the difference between achieved throughput and maximum theoretical throughput can often be significant.

This might sometimes be a source of dispute not being able to gain knowledge on if the current area is a "good" or "bad" spot, and hence e.g. if a specific high bit rate service (MBB) can be used at the moment.

It would therefore be pedagogical with the possibility to make users aware of what end user bit rate they could get from the network at that specific time and at that specific location. It would support an easy way to optimize the location of phone, modem or laptop.

In addition, given knowledge of expected throughput, background applications could choose to utilize the network more efficiently.

There are currently no known accurate methods to enable that the mobile terminal can predict what bit rate it would have if starting e.g. file down load at that time instance, i.e. predicting available bit rate without accessing the network.

Load information on its own, such as user perceived quality assessment performed by the mobile terminal itself within the cell, based e.g. on radio-link quality and utilization factor will not provide enough accurate bit rates or user quality estimations since scheduling policy, number of mobiles to share the channel with and radio quality of other mobile terminals in the cell has a significant impact. And further, the load estimate can be rather uncertain when not explicit signalled from the network.

SUMMARY

It is the object to obviate at least some of the above disadvantages and provide an improved performance within a wireless communication system.

According to a first aspect, the object is achieved by a method in a mobile terminal for predicting future data communication performance of transmissions between a base station and the mobile terminal. The base station and the mobile terminal are comprised in a wireless communication system. The method comprises receiving information from the base station. The received information concerns the relation between distribution characteristics and the performance of established data communications via the base station. Further the method comprises comparing the own distribution characteristics of the mobile terminal with the received information. In addition, the method also comprises determining the own predicted data communication performance. Such determination is based on the made comparison between the own distribution characteristics and the received information. Furthermore, the method comprises displaying the determined own predicted data communication performance on a display of the mobile terminal According to a second aspect, the object is also achieved by an arrangement in a mobile terminal for predicting future data communication performance of transmissions between a base station and the mobile terminal. The base station and the mobile terminal are comprised in a wireless communication system. The arrangement comprises a receiver. The receiver is adapted to receive information from the base station, concerning the relation between distribution characteristics and the performance of established data communications via the base station. Also, the arrangement in addition further comprises a comparison unit. The comparison unit is adapted to compare the own distribution characteristics of the mobile terminal with the received information. Further, the arrangement in addition also comprises a determining unit. The determining unit is adapted to determine the own predicted data communication performance based on the made comparison between the own distribution characteristics and the received information. In addition, the arrangement also comprises a display. The display is adapted to display the determined own predicted data communication performance.

According to a third aspect, the object is achieved by a method in a base station for assisting a mobile terminal in predicting future data communication performance of transmissions between the base station and the mobile terminal within a wireless communication system. The method comprises obtaining distribution characteristics of established data communications via the base station. Also, the method comprises obtaining the performance associated with the respective distribution characteristics of established data communications. Further, the method in addition comprises composing a parameterized function describing the relation between the distribution characteristics and the data communication performance. Additionally the method comprises sending information comprising the parameterized function to the mobile terminal.

According to a fourth aspect, the object is also achieved by an arrangement in a base station for assisting a mobile terminal in predicting future data communication performance of transmissions between the base station and the mobile terminal. The base station and the mobile terminal are situated within a wireless communication system. The arrangement comprises a first obtaining unit. The first obtaining unit is adapted to obtain distribution characteristics of established data communications via the base station. The arrangement also in addition comprises a second obtaining unit. The second obtaining unit is adapted to obtain the performance associated with the respective distribution characteristics of established data communications. Additionally the arrangement comprises a composing unit. The composing unit is adapted to compose a parameterized function describing the relation between the distribution characteristics and the data communication performance. Further, the arrangement comprises a sender. The sender is adapted to send information comprising the parameterized function to the mobile terminal.

By providing a mobile terminal with resource scheduling information from the base station according to the present solution, the mobile terminal could predict which bit rate it would obtain if it wanted to do e.g. a file download, without accessing the network. Thus the mobile terminal is provided with a prediction of the bit rate prior a session is set up.

Thereby, the possibility for a user of a mobile terminal to select the most appropriate opportunity for launching e.g. a bit rate demanding service is enhanced.

In addition, the user of a mobile terminal situated e.g. around the cell periphery is provided with a user friendly instrument for optimizing the location of the mobile terminal, thanks to the present solution.

Thus the knowledge of expected throughput as enabled by the present methods and arrangements provides a performance improvement both from an user/terminal point of view and from a system performance and effectiveness perspective.

Thanks to the present solution, an application or user of the mobile terminal could select to utilize the network when it expects fast access to the desired download information, with possible power saving in the mobile terminal as a result. For example interactive services could predict available bit rate instead of adapting bit rate after the service is up and running, thus having faster adjustment to correct quality. The latter would optimize utilization of the air interface by allowing e.g. a background application to use system resources when there is capacity left, hence improving general performance and efficiency within the wireless communication system.

Other objects, advantages and novel features of the invention will become apparent from the following detailed description of the invention.

BRIEF DESCRIPTION OF THE DRAWINGS

Embodiments of the present invention will now be described more in detail in relation to the enclosed drawings, in which.

DETAILED DESCRIPTION

The invention is defined as a method and an arrangement in a mobile terminal and as a method and an arrangement in a base station, which may be put into practice in the embodiments described below. This invention may, however, be embodied in many different forms and should not be construed as limited to the embodiments set forth herein; rather, these embodiments are provided so that this disclosure will be thorough and complete, and will fully convey the scope of the invention to those skilled in the art. It should be understood that there is no intent to limit the present methods and/or arrangements to any of the particular forms disclosed, but on the contrary, the present methods and arrangements are to cover all modifications, equivalents, and alternatives falling within the scope of the invention as defined by the claims.

Figure 1:
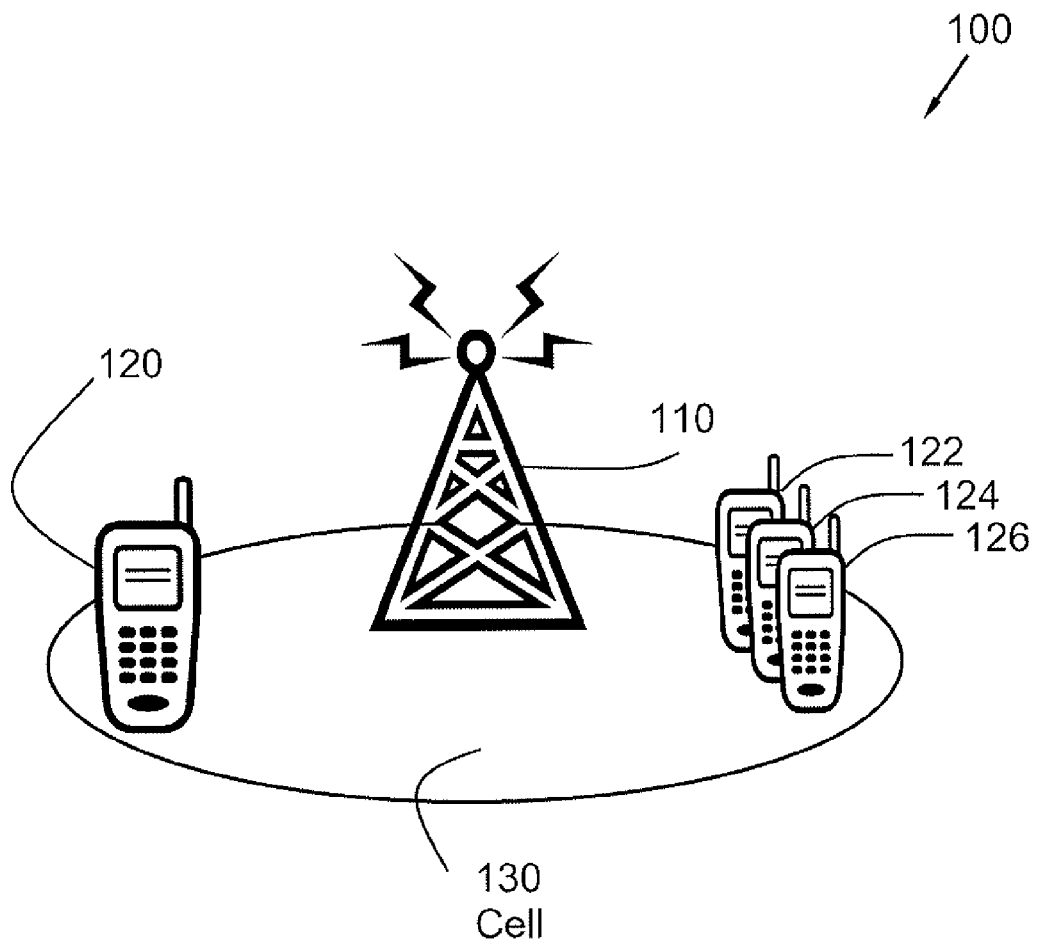
FIG. 1 is a schematic block diagram illustrating a wireless communication system, wherein the present solution may be applied.

FIG. 1 is a schematic illustration over a wireless communication system 100. The wireless communication system 100 comprises at least one base station 110 and is arranged to comprise a first mobile terminal 120, which at the moment is not transmitting data as part of a particular service. The base station 110 is further arranged to communicate with further mobile terminals 122, 124, 126, transmitting data as part of the particular service. The base station 110 may send and receive wireless signals to and from the mobile terminals 120, 122, 124, 126 situated within the cell 130.

Although only one base station 110 is shown in FIG. 1, it is to be understood that another configuration of base station transceivers may be connected through, for example, other network nodes, to define the wireless communication system 100. Further, the base station 110 may be referred to as e.g. a Remote Radio Unit, an access point, a Node B, an evolved Node B (eNode B) and/or a base transceiver station, a Radio Base Station (RBS), Access Point Base Station, base station router, etc depending e.g. of the radio access technology and terminology used.

In some embodiments, the mobile terminals 120, 122, 124 and/or 126 may be represented by a wireless communication device, a wireless communication terminal, a mobile cellular telephone, a Personal Communications Systems terminal, a Personal Digital Assistant (PDA), a laptop, a User Equipment (UE), computer or any other kind of device capable of managing radio resources.

The wireless communication system 100 may be based on technologies such as e.g. Universal Mobile Telecommunication Services (UMTS), Terrestrial Radio Access Network (UTRAN) Long-Term Evolution (LTE), also referred to as e-UTRAN, Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR) High Speed Packet Data Access (HSPA) etc, just to mention some few arbitrary and none limiting examples.

Further, as used herein, the wireless communication system 100 may further, according to some embodiments, refer to Wireless Local Area Networks (WLAN), such as Wireless Fidelity (WiFi) and Worldwide Interoperability for Microwave Access (WiMAX), Bluetooth or according to any other wireless communication technology.

The expression "downlink" is here used to specify the transmission from the base station 110 to the mobile terminals 120, 122, 124 and/or 126, while the expression "uplink" is used to denote the transmission from the mobile terminals 120, 122, 124 and/or 126 to the base station 110.

The base station 110 is further adapted to schedule the uplink transmissions from the mobile terminals 120, 122, 124 and/or 126, to the base station 110. In order to grant a particular mobile terminal 120 access to a particular uplink resource, a grant is sent from the base station 110 to that particular mobile terminal 120, based on e.g. a scheduling request sent by the mobile terminal 120 as the mobile terminal 120 may desire to access a certain service.

There are however several mechanisms, features and fundamental radio aspects that can cause the user bit rate to diverge from the maximum theoretical one when transmitting data within the wireless communication system 100. For example, the obtainable bit rate can depend on the number of active mobile terminals 122, 124, 126 in the cell 130, The active mobile terminals' 122, 124, 126 Channel Quality Indicator (CQI) distribution, scheduling algorithm, and the own CQI distribution of the not yet active mobile terminal 120.

The Channel Quality indicator (CQI) is a measurement of the communication quality of wireless channels. CQI can be a value, or values, representing a measure of channel quality for a given channel. Typically, a high value CQI is indicative of a channel with high quality and vice versa. A CQI for a channel may be computed by making use of performance metric, such as a signal-to-noise ratio (SNR), signal-to-interference plus noise ratio (SINR), signal-to-noise plus distortion ratio (SNDR), and so forth of the channel, according to different embodiments. These values and others may be measured for a given channel and then used to compute a CQI for the channel. The CQI for a given channel may be dependent upon the transmission and/or modulation scheme used by the wireless communication system 100. Other factors that may be taken into account in CQI are performance impairments, such as Doppler shift, channel estimation error, interference, and so forth.

The network i.e. the base station 110 is configured to estimate and/or knows the active mobile terminals' 122, 124, 126 CQI distribution. The distribution of CQI corresponds to when each mobile terminal 122, 124, 126 get channel resources, scheduled CQI, and users' throughput.

Further, from this data the base station 110 can estimate resources available to a new mobile terminal 120, having a specific CQI distribution, and the base station 110 can broadcast the corresponding information for a range of CQI distributions to mobile terminals 120, 122, 124, 126 in the current cell 130. Subsequently, concerned mobile terminals 120, 122, 124, 126 can map their own CQI distribution to the broadcasted resource information, i.e. CQI/ throughput related information for different CQI distributions and hence conclude own expected throughput, which will be further explained in association with FIG. 2, FIG. 3 and FIG. 4.

Figure 2:
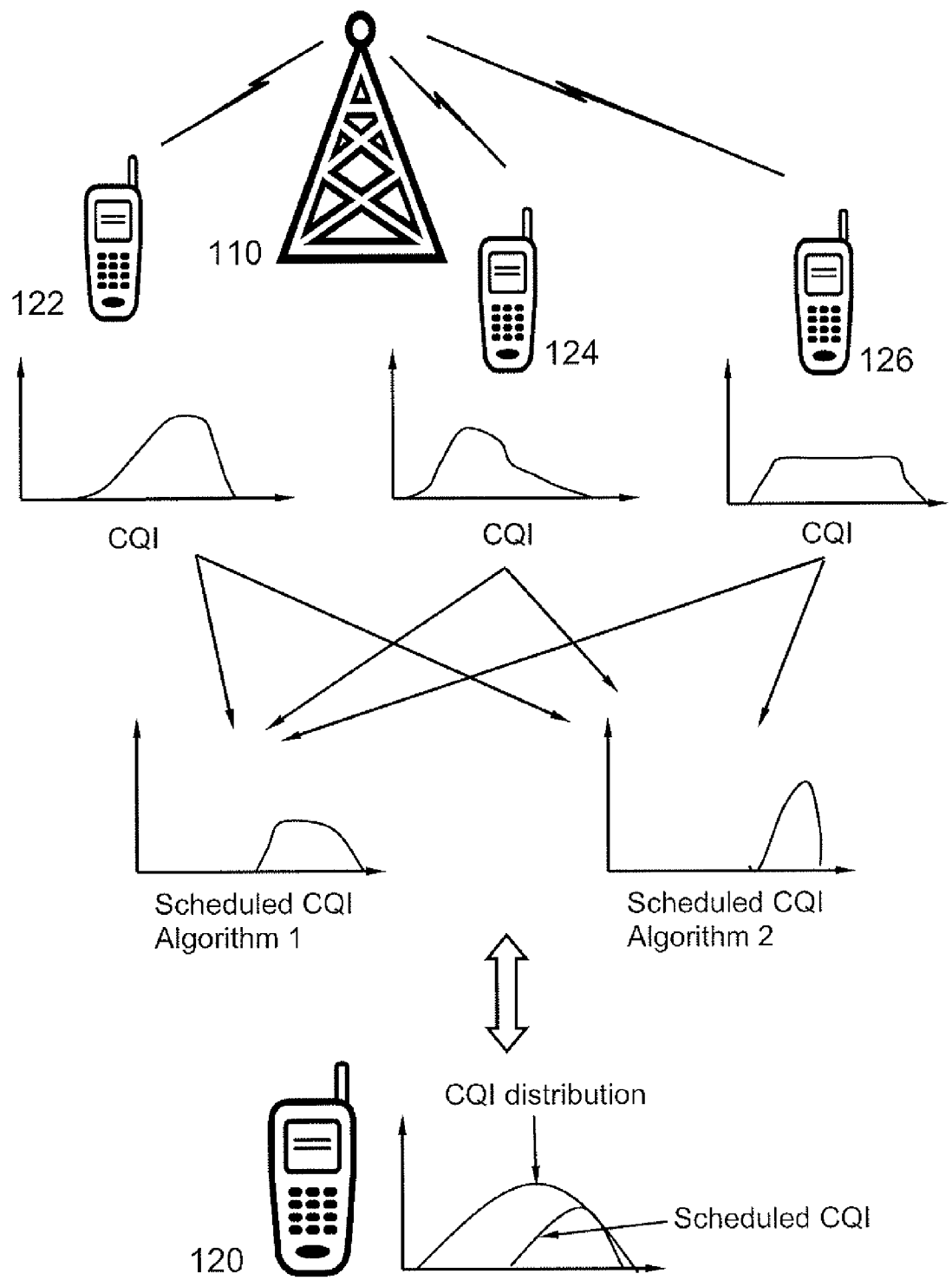
FIG. 2 is a conceptual illustration depicting how CQI for a new mobile terminal entering a cell is compared to the CQI of scheduled mobile terminals in the cell.

FIG. 2 is a conceptual illustration depicting how CQI for a new mobile terminal 120 entering the cell 130 is compared to the CQI of scheduled mobile terminals 122, 124, 126 in the cell 130.

In the base station scheduler, information on the number of currently scheduled mobile terminals 122, 124, 126 and their corresponding bit rate is available. Scheduling algorithm and resulting scheduled CQI determines what a new mobile terminal 120 has to compete against. For example, with a round robin scheduler (Algorithm 1) a new mobile terminal 120 may get resources scheduled dependent on the amount of already scheduled mobile terminals 122, 124, 126; three in this exemplary embodiment. With a max C/I scheduling algorithm (Algorithm 2) the scheduled resources depend on the CQI relative the CQIs of the other mobile terminals 122, 124, 126. The new terminal 120 may be scheduled more resources if it has higher CQI than the currently scheduled terminals 122, 124, 126 than in the case it has lower CQI than them.

Finally, a comparison and/or transformation concerning new mobile terminal's 120 distribution to scheduled CQI to predict resources and bitrate available to the new mobile terminal 120.

Figure 3:
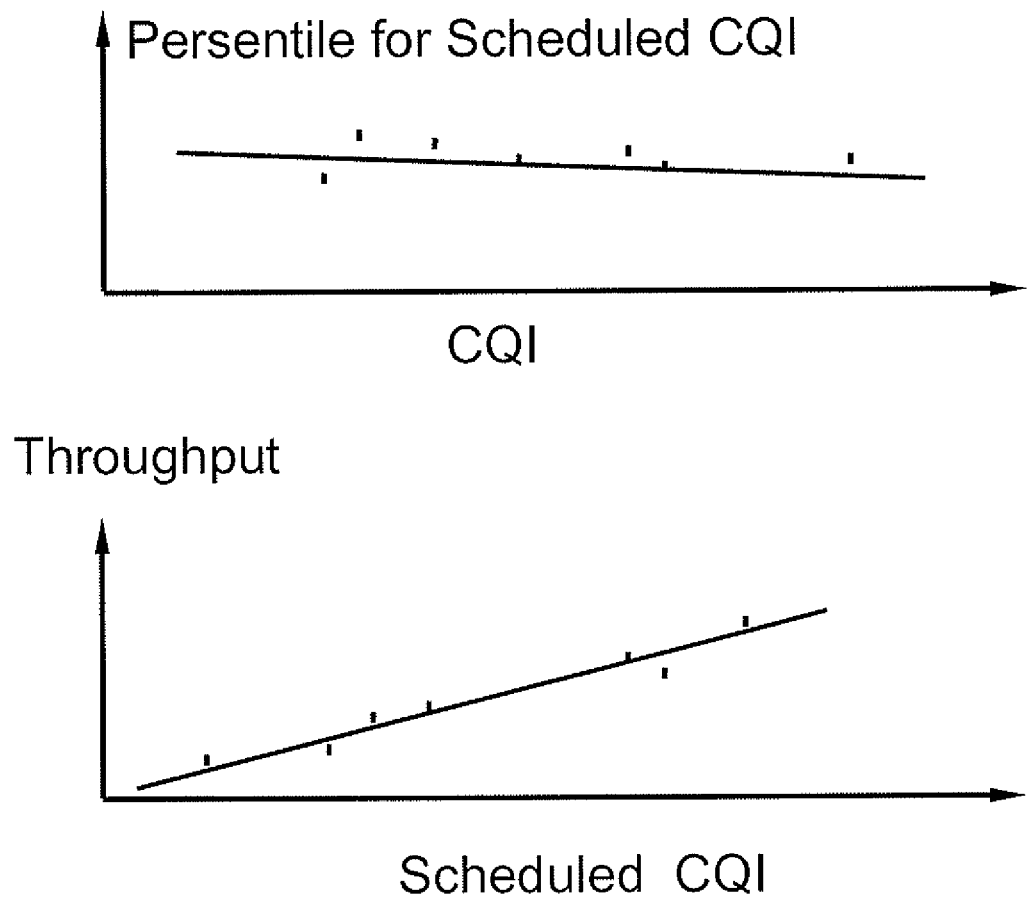
FIG. 3 is a conceptual illustration depicting an exemplified mapping between percentile of scheduled CQI and measured CQI, and scheduled CQI and throughput, respectively.

FIG. 3 is a conceptual illustration depicting an exemplified mapping between percentile of scheduled CQI and measured CQI, and scheduled CQI and throughput, respectively.

The resulting scheduled CQI, i.e. the CQI that a specific mobile terminal 122, 124, 126 had when it was scheduled and information on used scheduling algorithm/policy, in combination with other air interface measures such as interference, cell load etc. determines what already present CQI the new mobile terminal 120 has to compete against in order to get scheduled, i.e. the new mobile terminal's 120 CQI is compared to scheduled CQI to predict what resources, hence in the end bit rate that statistically is available to/for the new mobile terminal 120.

The prediction and estimation of available resources for a new mobile terminal 120 entering the specific cell 130 may be performed according to the following exemplified scheme, according to some embodiments.

The information broadcasted by the base station 110 may be considered. The broadcasted information may comprise the distribution characteristics ($d_i$) and scheduled resources ($f_i$).

The entity $d_i$ could either be mean or mean & std (standard deviation) of measured CQI and/or scheduled CQI, what percentile the scheduled CQI corresponds to in the measured CQI distribution, or a fix offset, together with mean of the measured CQI distribution, etc. The scheduled resources ($f_i$) may for example be bit rate. It can also be amount of scheduled resources such as resource blocks, time-slots and/or frequencies.

The set of distribution characteristics and scheduled resource for a range of possible distributions [($d_1$, $f_1$), ($d_2$, $f_2$), ..., ($d_n$, $f_n$)] are broadcasted to all mobile terminals 120, 122, 124, 126 in the cell 130. Note that $d_i$ itself can be a set of information. The data set may be described in many ways; e.g. described through a selected subset of the data set, or described through a general function, or described through a descriptive function achieved via regression, or described through an arbitrary polynomial, or described through Bezier or (B-)spline curves, or described through power series, or described through any kind of transform, or described through any syntactical programming language, such as e.g. C/C++/Java/ etc.

FIG. 3 shows first which percentile the scheduled CQI corresponds to in the measured CQI and also, in a next step, which bit rate a scheduled CQI value corresponds to. The measured CQI to scheduled CQI can simply be straight forward or with an offset. An alternative is as the example in FIG. 3 by defining a percentile of the mobile terminals measured CQI. In this way, mobile terminals 120, 122, 124, 126 with the same mean CQI but with different variance may still obtain an estimation of the future throughput.

However, both simpler and more advanced mappings, e.g. taking the fraction of channel usage for mobile terminals 120, 122, 124, 126 with a specific scheduled CQI into account, might be used according to different embodiments of the present methods.

Then, the mobile terminal 120 receives distribution and rate vector information [($d_1$, $f_1$), ($d_2$, $f_2$), ..., ($d_n$, $f_n$)], e.g. over a broadcast channel or a multicast channel, according to some embodiments.

The mobile terminal 120 then compares own CQI distribution to the distribution and rate vector information [($d_1$, $f_1$), ($d_2$, $f_2$), ..., ($d_n$, $f_n$)].

By interpolation between $(d_1, f_1)$-pairs in the rate vector, or by using a parametric function, the mobile terminal 120 may predict the future bit rate, based on the own CQI distribution.

Figure 4:
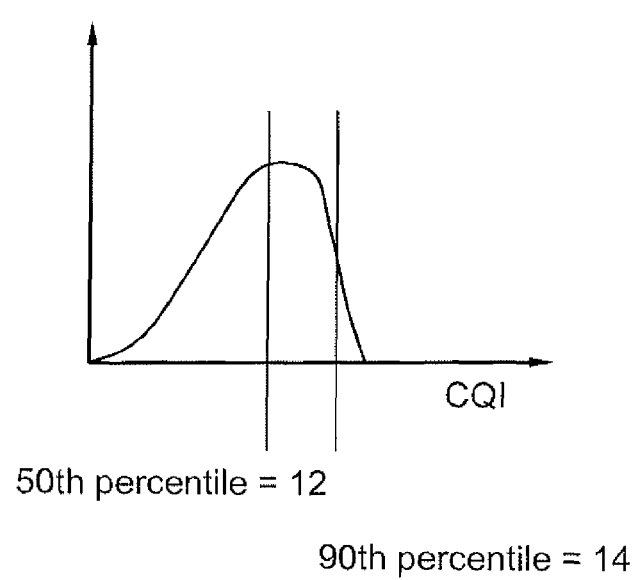
FIG. 4 is a conceptual illustration depicting exemplifying how the scheduled CQI for two different mobile terminals relate, according to some embodiments.
Figure 4:
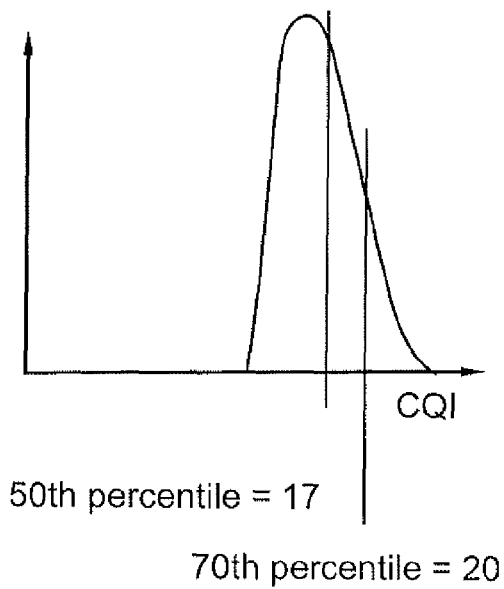

FIG. 4 is a conceptual illustration depicting exemplifying how the scheduled CQI for two different mobile terminals 120, 122 relate, according to some embodiments depending on variance.

The CQI distribution for different users, e.g. 120 and 122 can differ. This includes that their distributions can have different shapes, for example different mean, variance or skewness. Hence, when users get the information from FIG. 3, they can use their own average/median CQI to predict what average CQI they can expect to be scheduled on. For mobile terminal 120, which have median of 12, it may be expected that it in average will be scheduled at its 90th percentile. This means it can expect to get data on CQI values corresponding to CQI 14. The reason why it is not on the median value depends on that the scheduler may have scheduling mechanisms which bias the used CQI. Examples of such schedulers are different versions of proportional fairness in time and/or frequency, max C/I or any hybrid thereof. The other mobile terminal 122 has a distribution with a median CQI equal to 17; based on how the scheduler works, mobile 122 will in average be scheduled on its 70th percentile which corresponds to a CQI of 20.

Figure 5:
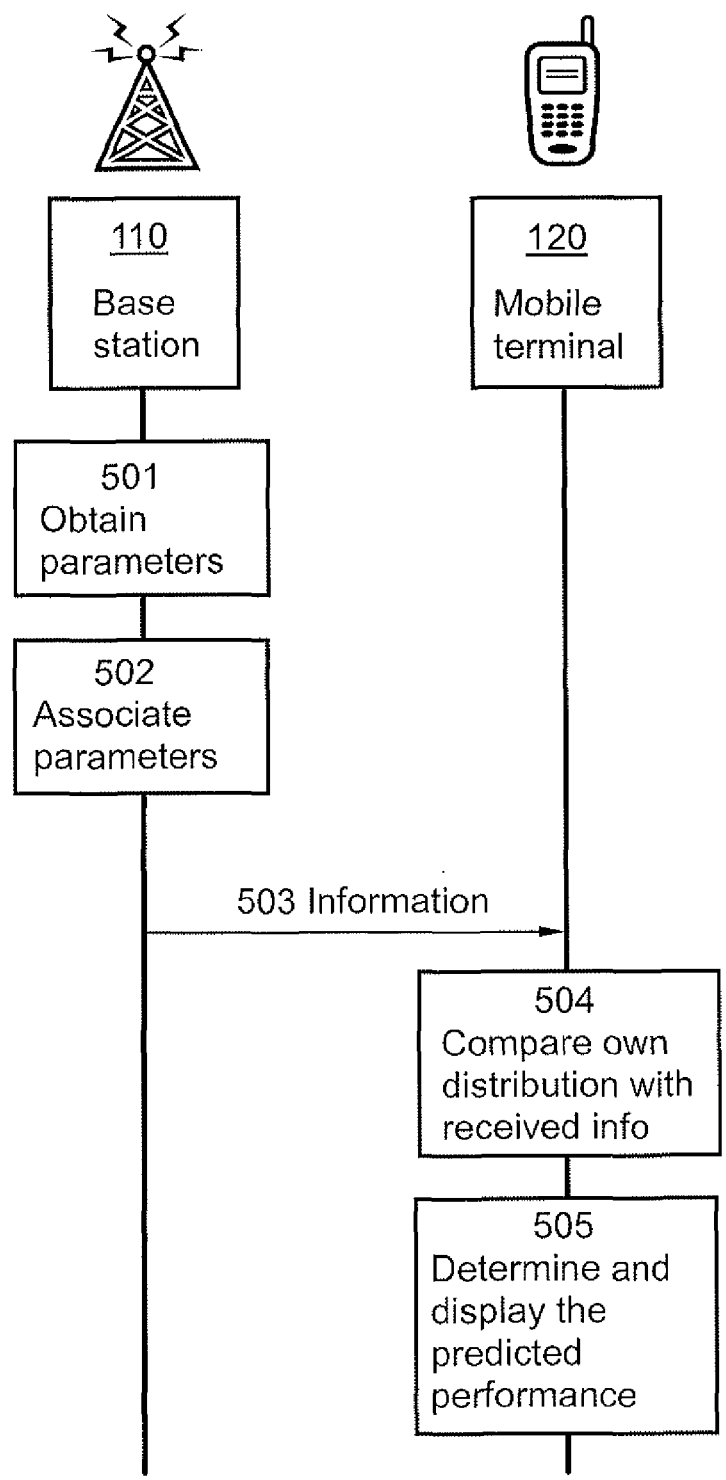
FIG. 5 is a combined flow chart and event diagram illustrating communication between the base station and the mobile terminal according to some embodiments.

FIG. 5 is a combined flow chart and event diagram illustrating communication between the base station 110 and the mobile terminal 120 according to some embodiments.

In a first step 501, the base station 110 may obtain parameters such as e.g. distribution characteristics ($d_i$) and scheduled resources ($f_i$) from the active mobile terminals 122, 124, 126 within the cell 130, as previously described.

The base station 110 may according to some embodiments associate, in step 502, the obtained parameters with each other e.g. in a vector $[(d_1, f_1), (d_2, f_2), \ldots, (d_n, f_n)]$.

The distribution and rate vector information $[(d_1, f_1), (d_2, f_2), \ldots, (d_n, f_n)]$ may then be sent or broadcasted to the mobile terminal 120 e.g. over a broadcast channel or a multicast channel, according to some embodiments.

The mobile terminal 120 may use the received distribution and rate vector information $[(d_1, f_1), (d_2, f_2), \ldots, (d_n, f_n)]$ for comparison between the own distribution and the received information.

Thus, in step 505 the predicted performance e.g. bit rate may be determined and displayed at the mobile terminal 120.

The predicted performance such as e.g. bit rate prediction, or corresponding measure may be displayed in the display of the mobile terminal 120, similar to the signal strength icon on e.g. GSM/UMTS phones, according to some embodiments. It can also be displayed in other ways as the actual predicted user bitrate or by indicating unavailable services due to too low bitrate e.g. by gray their icons or menus out.

The bit rate prediction may also according to some embodiments, be made available to user defined applications, which could choose to access the base station 110 at the right time or request services that the radio network can manage.

More specifically, an application may thereby choose to establish access with the base station 110 and utilize the network 100 when it expects fast access to the needed download information, with possible power saving as a result. Interactive services, for example, may predict available bit rate instead of adapting bit rate after the service is up and running. Thus a faster adjustment to correct quality may be achieved. This can be applied on streaming services and adaptive voice coders such as e.g. Adaptive Multi Rate (AMR) speech coder.

In some further embodiments, predicted throughput, or similar information may be transmitted not only on a broadcast channel, but on any other channel in a manner that specific mobile terminal 120, or optionally applications therein, may request to have such information scheduled to them, typically in form of service subscription using multicasting for distribution.

Figure 6:
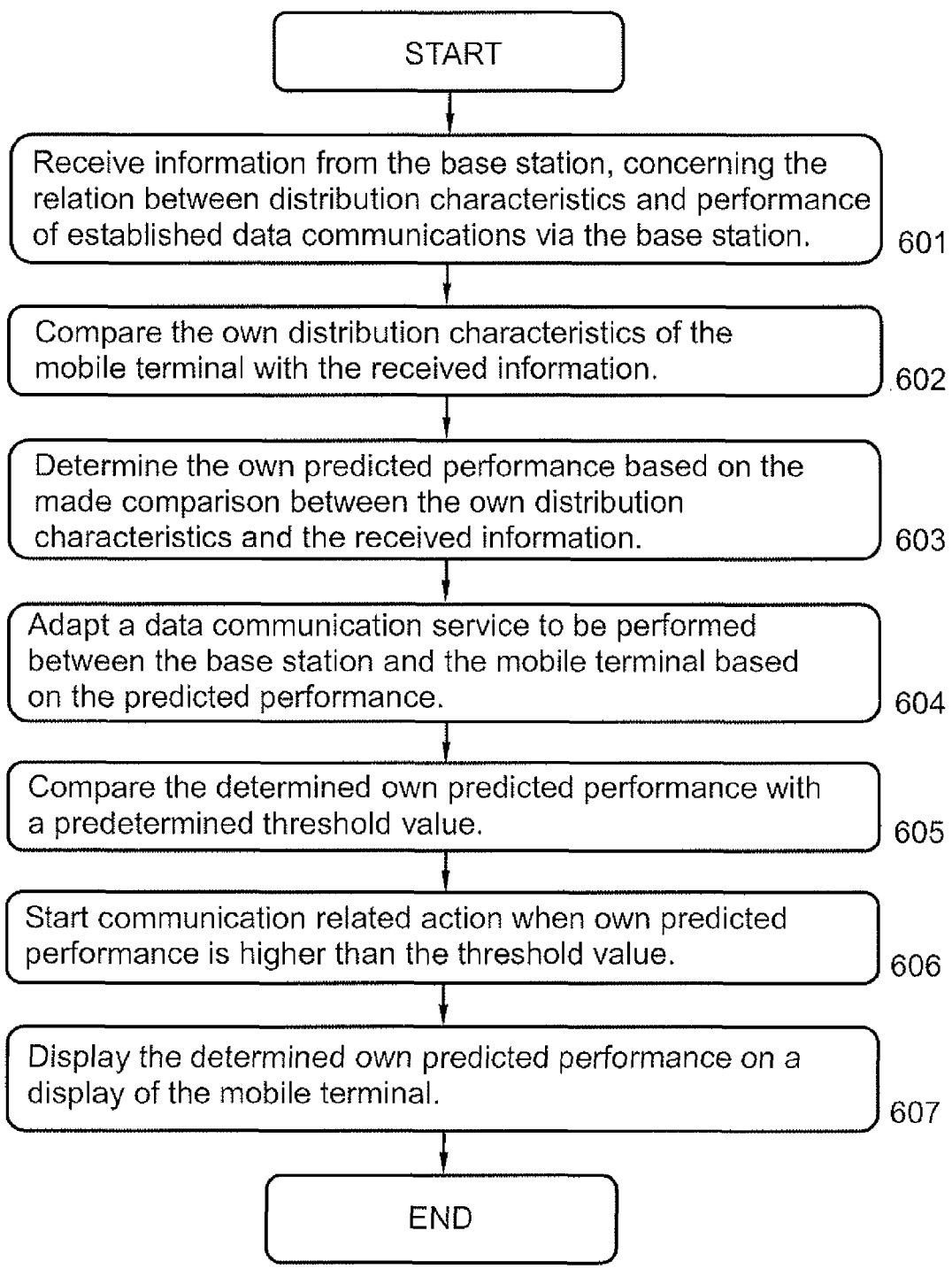
FIG. 6 is a flow chart illustrating embodiments of method steps in a mobile terminal.

FIG. 6 is a flow chart illustrating embodiments of method steps 601-607 in a mobile terminal 120. The method aims at predicting future data communication performance of transmissions between a base station 110 and the mobile terminal 120. The base station 110 and the mobile terminal 120 are comprised within a wireless communication system 100.

The prediction of future data communication performance of transmissions between the base station 110 and the mobile terminal 120, as part of a particular service, may according to some embodiments be performed before any user data associated with that service has been transmitted between the base station 110 and the mobile terminal 120.

The predicted data communication performance may comprise at least one parameter of: data bit rate, max/min bit rate, bit rate jitter, delay and/or delay jitter.

To appropriately predict future data communication performance of transmissions sent between the base station 110 and the mobile terminal 120, the method may comprise a number of method steps 601-607.

It is however to be noted that some of the described method steps 601-607 are optional and only comprised within some embodiments. Further, it is to be noted that the method steps 601-607 may be performed in any arbitrary chronological order and that some of them, e.g. step 604 and step 607, or even all steps may be performed simultaneously or in an altered, arbitrarily rearranged, decomposed or even completely reversed chronological order. The method may comprise the following steps:

Step 601

Information is received from the base station 110, concerning the relation between distribution characteristics and the performance of established data communications via the base station 110.

The distribution characteristics may be e.g. radio quality distribution characteristics, such as e.g. CQI distribution, according to some embodiments.

The information received from the base station 110 may optionally comprise a parameterized function associated with fraction allocation and/or channel allocation, according to some embodiments. The optional parameterized function thus corresponds to the relation between distribution characteristics and the performance of established data communications. Furthermore, the optional parameterized function may be parameterized to a polynomial of low order, or a simple function, or composed in form of a vector comprising sets of distribution characteristics and scheduled resource for a range of possible distributions such as e.g. $[(d_1, f_1), (d_2, f_2), \ldots, (d_n, f_n)]$, as previously discussed.

The information may be received from the base station 110 over a broadcast channel and/or a multicast channel, according to some embodiments.

Step 602

The own distribution characteristics of the mobile terminal 120 is compared with the received information.

Step 603

The own predicted data communication performance is determined, based on the made comparison between the own distribution characteristics and the received information.

Step 604

A data communication service may be adapted to be performed between the base station 110 and the mobile terminal 120 based on the predicted data communication performance.

The data communication service may comprise providing the predicted data communication performance to other higher layer applications.

Step 605

The determined own predicted data communication performance may optionally be compared with a predetermined threshold value, according to some embodiments.

Step 606

A communication related action may be started when the own predicted data communication performance is higher than the predetermined threshold value, according to some embodiments.

Step 607

The determined own predicted data communication performance is displayed on a display 760 of the mobile terminal 120.

Figure 7:
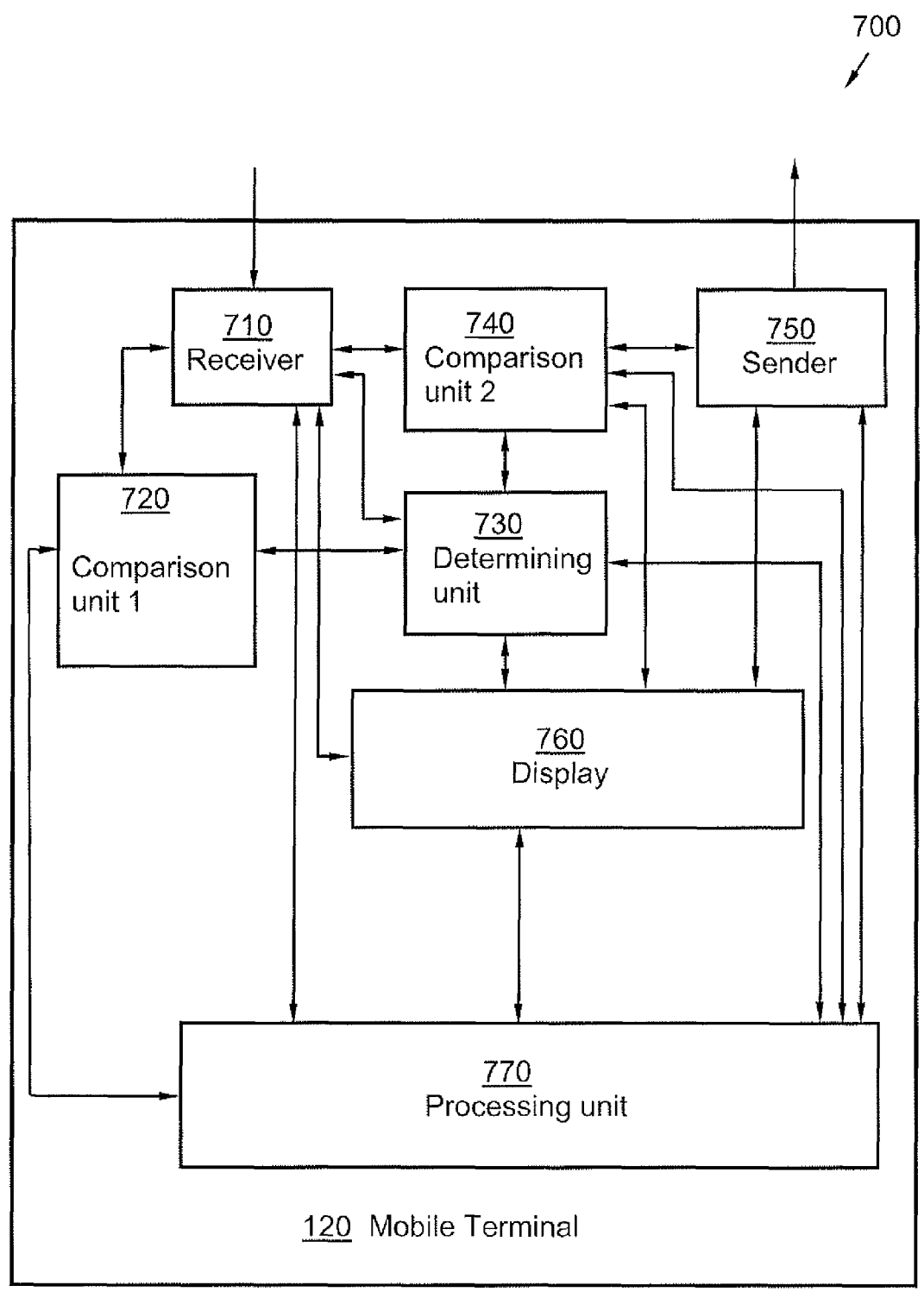
FIG. 7 is a block diagram illustrating embodiments of an arrangement in a mobile terminal.

FIG. 7 is a block diagram illustrating embodiments of an arrangement 700 in a mobile terminal 120. The arrangement 700 is configured to perform the method steps 601-607 for predicting future data communication performance of transmissions between a base station 110 and the mobile terminal 120. The base station 110 and the mobile terminal 120 are comprised within a wireless communication system 100.

For the sake of clarity, any internal electronics of the arrangement 700, not completely indispensable for understanding the present method has been omitted from FIG. 7.

The arrangement 700 in the mobile terminal 120 comprises a receiver 710. The receiver 710 is adapted to receive information from the base station 110. The received information concerns the relation between distribution characteristics and the performance of established data communications via the base station 110.

Further, the arrangement 700 comprises a first comparison unit 720. The first comparison unit 720 is adapted to compare the own distribution characteristics of the mobile terminal 120 with the received information.

In addition, the arrangement 700 comprises a determining unit 730. The determining unit 730 is adapted to determine the own predicted data communication performance based on the made comparison between the own distribution characteristics and the received information.

Also, the arrangement 700 comprises a display 760. The display 760 is adapted to display the determined own predicted data communication performance.

According to some embodiments, the arrangement 700 may comprise a second comparison unit 740. The optional second comparison unit 740 may be adapted to compare the determined own predicted data communication performance with a predetermined threshold value, according to some embodiments.

In addition, the arrangement 700 may comprise, according to some embodiments, a transmitter 750. The transmitter 750 may be arranged to transmit radio signals.

Furthermore, the arrangement 700 may, according to some embodiments, further comprise a processing unit 770. The processing unit 770 may be represented by e.g. a Central Processing Unit (CPU), a processor, a microprocessor, or other processing logic that may interpret and execute instructions. The processing unit 770 may perform all data processing functions for inputting, outputting, and processing of data including data buffering and device control functions, such as call processing control, user interface control, or the like.

It is to be noted that the described units 710-770 comprised within the arrangement 700 in the mobile terminal 120 may be regarded as separate logical entities, but not with necessity as separate physical entities. Any, some or all of the units 710-770 may be comprised or co-arranged within the same physical unit. However, in order to facilitate the understanding of the functionality of the arrangement 700, the comprised units 710-770 are illustrated as separate units in FIG. 7.

Thus the receiving unit 710 and e.g. the transmitter unit 750 may, according to some embodiments, be comprised within one physical unit, a transceiver, which may comprise a transmitter circuit and a receiver circuit, which respectively transmits outgoing radio frequency signals to the base station 110 and receives incoming radio frequency signals from the base station 110 via an optional antenna.

Particular Embodiments within the Mobile Terminal 120

The presently described method in the mobile terminal 120 may be implemented through one or more processor units 770 in the mobile terminal 120, together with computer program code comprising instructions for performing the functions of the method steps 601-607. Thus a computer program product, comprising instructions for performing the method steps 601-607 in the mobile terminal 120 may perform a prediction of future data communication performance of transmissions between the base station 110 and the mobile terminal 120, when the computer program product is executed on the processing unit 770, comprised within the mobile terminal 120.

The computer program product mentioned above may be provided for instance in the form of a data carrier carrying computer program code for performing the method steps according to the present solution when being loaded into the processor unit 770. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloaded to the mobile terminal 120 remotely. Thus, embodiments of the present invention may take the form of an entirely hardware embodiment, a software embodiment or an embodiment combining software and hardware aspects all generally referred to herein as a circuit.

Figure 8:
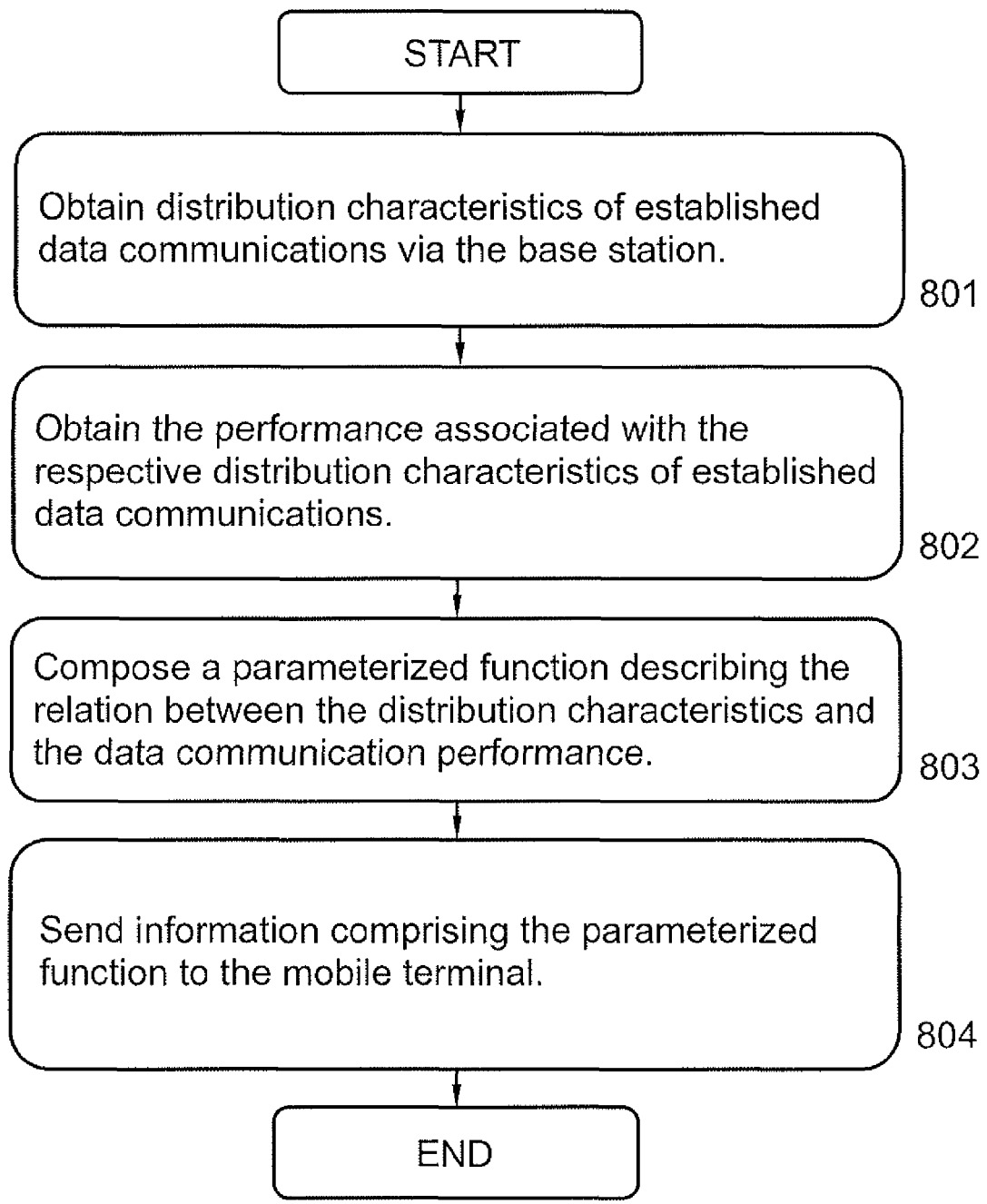
FIG. 8 is a flow chart illustrating embodiments of method steps in a base station.

FIG. 8 is a flow chart illustrating embodiments of method steps in a base station 110. The method aims at assisting a mobile terminal 120 in predicting future data communication performance of transmissions between the base station 110 and the mobile terminal 120. The base station 110 and the mobile terminal 120 are comprised within a wireless communication system 100.

The prediction of future data communication performance of transmissions between the base station 110 and the mobile terminal 120, as part of a particular service, may according to some embodiments be performed before any user data associated with that service has been transmitted between the base station 110 and the mobile terminal 120.

The predicted data communication performance may comprise at least one parameter of: data bit rate, max/min bit rate, bit rate jitter, delay and/ or delay jitter.

To appropriately assist the mobile terminal 120 in performing prediction of future data communication performance of transmissions, the base station method may comprise a number of method steps 801-804, to be performed in the base station 110.

It is however to be noted that the method steps 801-804 may be performed in any arbitrary chronological order and that some of them, e.g. step 801 and step 802, or even all steps may be performed simultaneously or in an altered, arbitrarily rearranged, decomposed or even completely reversed chronological order. The method may comprise the following steps:

Step 801

Distribution characteristics of established data communications via the base station 110 are obtained. The data communication thus concerns mobile terminals 122, 124, 126 which have established a data connection with the base station 120 e.g. by accessing a certain service.

Step 802

The performance, which is associated with the respective obtained distribution characteristics of established data communications, are obtained.

Step 803

A parameterized function describing the relation between the obtained distribution characteristics and the obtained data communication performance is composed. The parameterized function may be parameterized to a polynomial of low order, or a simple function, or composed in form of a vector comprising sets of distribution characteristics and scheduled resource for a range of possible distributions such as e.g. $[(d_1, f_1), (d_2, f_2), \ldots, (d_n, f_n)]$, as previously discussed.

Step 804

Information comprising the parameterized function is sent to the mobile terminal 120.

The information may according to some embodiments be sent to the mobile terminal 120 over a broadcast channel and/or a multicast channel. Thus the information may be broadcasted to all mobile terminals 120, 122, 124, 126 within the cell 130 according to some embodiments. However, according to some embodiments, the information may be multicasted to some particular mobile terminals 120, who are e.g. subscribing on the particular service of receiving a prediction of future data communication performance concerning transmissions between the base station 110 and the mobile terminal 120.

Further, the information optionally may comprise a function associated with fraction allocation and/or channel allocation, according to some embodiments.

Figure 9:
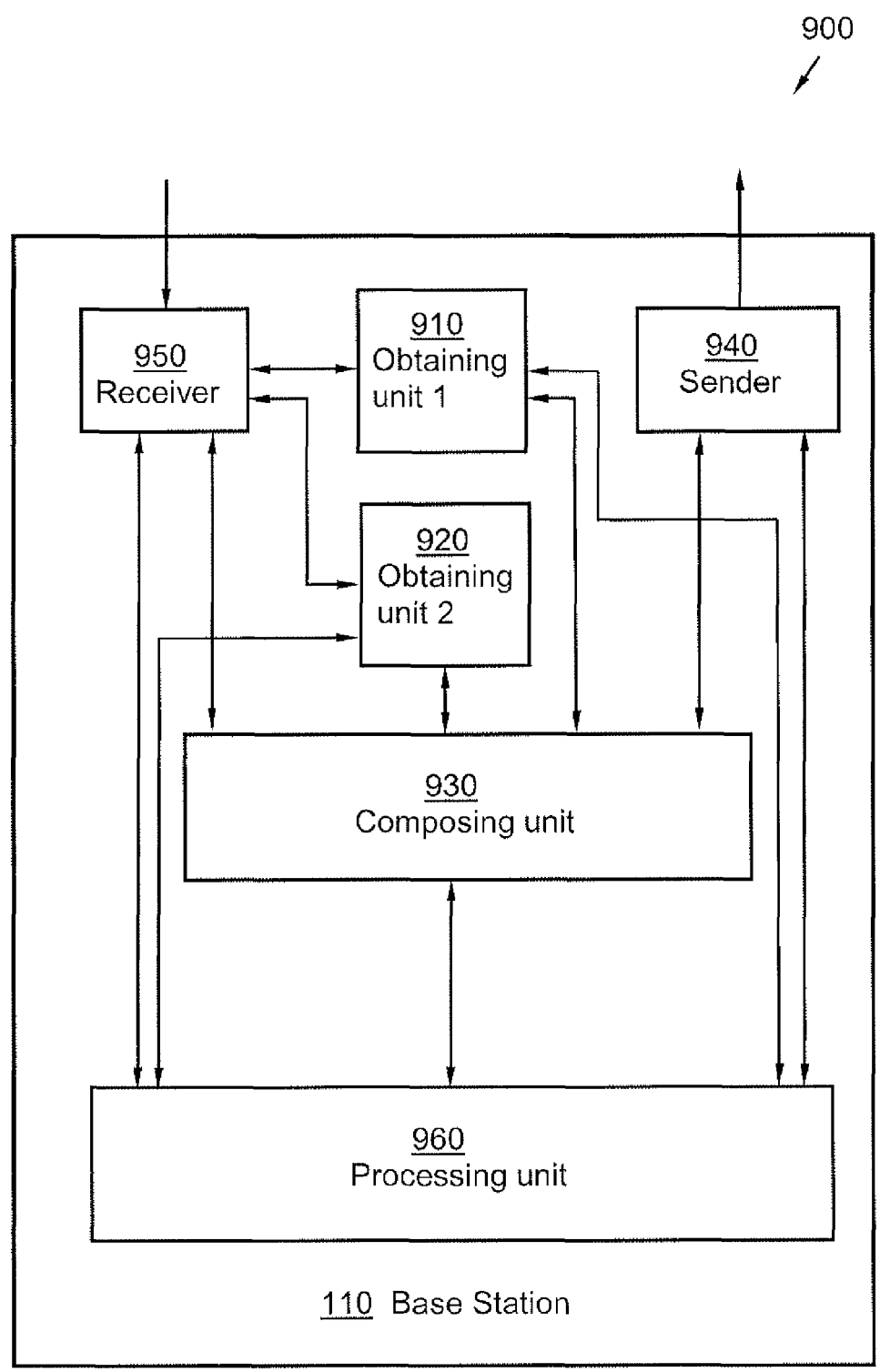
FIG. 9 is a block diagram illustrating embodiments of an arrangement in a base station.

FIG. 9 is a block diagram illustrating embodiments of an arrangement 900 in a base station 110. The arrangement 900 is configured to perform the method steps 801-804 for assisting a mobile terminal 120 in predicting future data communication performance of transmissions between the base station 110 and the mobile terminal 120. The base station 110 and the mobile terminal 120 are comprised within a wireless communication system 100.

For the sake of clarity, any internal electronics of the arrangement 900, not completely essential for understanding the present base station arrangement has been omitted from FIG. 9.

The arrangement 900 comprises a first obtaining unit 910. The first obtaining unit 910 is adapted to obtain distribution characteristics of established data communications via the base station 110.

Also, the arrangement 900 comprises a second obtaining unit 920. The second obtaining unit 920 is adapted to obtain the performance associated with the respective distribution characteristics of established data communications.

In addition, the arrangement 900 comprises a composing unit 930. The composing unit 930 is adapted to compose a parameterized function describing the relation between the distribution characteristics and the data communication performance.

Furthermore, the arrangement 900 comprises a sender 940. The sender 940 is adapted to send information comprising the parameterized function to the mobile terminal 120.

Further yet, the arrangement 900, according to some embodiments may comprise a receiver 950. The receiver 950 is adapted to receive radio signals from e.g. the mobile terminal 120.

Further, the arrangement 900 may, according to some embodiments, further comprise a processing unit 960. The processing unit 960 may be represented by e.g. a Central Processing Unit CPU), a processor, a microprocessor, or other processing logic that may interpret and execute instructions. The processing unit 960 may perform data processing functions for inputting, outputting, and processing of data including data buffering and device control functions, such as call processing control, user interface control, or the like.

It is to be noted that the described units 910-960 comprised within the arrangement 900 in the base station 110 may be regarded as separate logical entities, but not with necessity as separate physical entities. Any, some or all of the units 910-960 may be comprised or co-arranged within the same physical unit. However, in order to facilitate the understanding of the functionality of the arrangement 900, the comprised units 910-960 are illustrated as separate units in FIG. 9.

Thus the receiving unit 950 and e.g. the sender 940 may, according to some embodiments, be comprised within one physical unit, a transceiver, which may comprise a transmitter circuit and a receiver circuit, which respectively transmits outgoing radio frequency signals to the mobile terminal 120 and receives incoming radio frequency signals from the mobile terminal 120 via an optional antenna.

Particular Embodiments within the Base Station 110

The method steps 801-804 in the base station 110 may be implemented through one or more processor units 960 in the base station 110, together with computer program code for performing the functions of the present method steps 801-804. Thus a computer program product, comprising instructions for performing the method steps 801-804 in the base station 110 may assist a mobile terminal 120 in predicting future data communication performance of transmissions between the base station 110 and the mobile terminal 120, when the computer program product is executed on the processing unit 960, comprised within the base station 110.

The computer program product mentioned above may be provided for instance in the form of a data carrier carrying computer program code for performing the method steps according to the present solution when being loaded into the processor unit 960. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloaded to the base station 110 remotely, e.g. over an Internet or an intranet connection. Thus, embodiments of the present invention may take the form of an entirely hardware embodiment, a software embodiment or an embodiment combining software and hardware aspects all generally referred to herein as a circuit.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method, in a first mobile terminal, for predicting the performance of future data communications between the first mobile terminal and a base station within a wireless communication system, the method comprising:
    receiving, at the first mobile terminal, information about at least one other second mobile terminal, the at least one second mobile terminal having established data communications with the base station and being distinct from the first mobile terminal, wherein the information comprises:
        a second distribution of signal quality characteristics of the at least one second mobile terminal;
        for each signal quality characteristic of the at least one second mobile terminal in the second distribution, a corresponding performance metric of the established data communications;
    comparing a first distribution of signal quality characteristics of the first mobile terminal with the received second distribution wherein said first distribution and said second distribution are at least a mean or a standard deviation;
    predicting the performance of future data communications between the first mobile terminal and the base station based on said comparison; and
    displaying the predicted performance on a display of the first mobile terminal.

2. The method according to claim 1, wherein the information is received from the base station over either a broadcast channel or a multicast channel.

3. The method according to claim 1, further comprising adapting a data communication service to be performed between the base station and the first mobile terminal based on the predicted performance.

4. The method according to claim 3, wherein said adapting comprises providing the predicted performance to higher layer applications.

5. The method according to claim 1, further comprising:
    comparing the predicted performance with a predetermined threshold value; and
    starting a communication related action when the predicted performance is higher than the predetermined threshold value.

6. The method according to claim 1, wherein said future data communications relate to a particular service and wherein said prediction is performed before any user data associated with that service has been transmitted between the base station and the first mobile terminal.

7. The method according to claim 1, wherein the predicted performance comprises at least one of a predicted data bit rate, max/min bit rate, bit rate jitter, delay and delay jitter.

8. The method according to claim 1, wherein the information received from the base station comprises a parameterized function associated with at least one of fraction allocation and channel allocation.

9. The method according to claim 1, wherein the second distribution of signal quality characteristics comprises a distribution of channel quality indicators (CQIs) associated with a particular second mobile terminal.

10. A first mobile terminal configured to predict the performance of future data communications between the first mobile terminal and a base station within a wireless communication system, wherein the first mobile terminal comprises:
    a receiver configured to receive information about at least one other second mobile terminal, the at least one second mobile terminal having established data communications with the base station and being distinct from the first mobile terminal, wherein the information comprises:
        a second distribution of signal quality characteristics of the at least one second mobile terminal;
        for each signal quality characteristic of the at least one second mobile terminal in the second distribution, a corresponding performance metric of the established data communications;
    one or more at least partially-hardware processing circuits configured to:
        compare a first distribution of signal quality characteristics of the first mobile terminal with the received second distribution wherein said first distribution and said second distribution are at least a mean or a standard deviation;
        predict the performance of future data communications based on the comparison;
    a display configured to display the predicted performance.

11. The first mobile terminal according to claim 10, wherein the information is received from the base station over either a broadcast channel or a multicast channel.

12. The first mobile terminal according to claim 10, wherein the one or more at least partially-hardware processing circuits are further configured to adapt a data communication service to be performed between the base station and the first mobile terminal based on the predicted performance.

13. The first mobile terminal according to claim 12, wherein the one or more at least partially-hardware processing circuits are configured to adapt the service by providing the predicted performance to higher layer applications.

14. The first mobile terminal according to claim 10, wherein the second distribution of signal quality characteristics comprises a distribution of channel quality indicators (CQIs) associated with a particular second mobile terminal.

15. A method in a base station for assisting a first mobile terminal in predicting the performance of future data communications between the base station and the first mobile terminal within a wireless communication system, the method comprising:
    obtaining a distribution of signal quality characteristics of at least one other second mobile terminal, the at least one second mobile terminal having established data communications with the base station and being distinct from the first mobile terminal wherein said first distribution and said second distribution are at least a mean or a standard deviation;

obtaining the performance of the established data communications;

composing a parameterized function comprising:
the obtained distribution of signal quality characteristics;
for each signal quality characteristic in the obtained distribution, a corresponding performance metric based on the obtained performance; and sending information comprising the parameterized function to the first mobile terminal.

16. The method according to claim 15, wherein the information is sent to the first mobile terminal over either a broadcast channel or a multicast channel.

17. The method according to claim 15, wherein the information further comprises a function associated with at least one of fraction allocation and channel allocation.

18. The method according to claim 15, wherein the predicted performance comprises at least one of predicted data bit rate, max/min bit rate, bit rate jitter, delay and delay jitter.

19. The method according to claim 15, wherein the distribution of signal quality characteristics comprises a distribution of channel quality indicators (CQIs) associated with a particular second mobile terminal.

20. A base station for assisting a first mobile terminal in predicting the performance of future data communications between the base station and the first mobile terminal within a wireless communication system, the base station comprising:

one or more at least partially-hardware circuits configured to:
obtain a distribution of signal quality characteristics of at least one other second mobile terminal, the at least one second mobile terminal having established data communications with the base station and being distinct from the first mobile terminal wherein said first distribution and said second distribution are at least a mean or a standard deviation;
obtain the performance of the established data communications;
compose a parameterized function comprising:
the obtained distribution of signal quality characteristics;
for each signal quality characteristic in the obtained distribution, a corresponding performance metric based on the obtained performance; and
send information comprising the parameterized function to the first mobile terminal.

* * * * *